UNITED STATES PATENT OFFICE 2,147,271

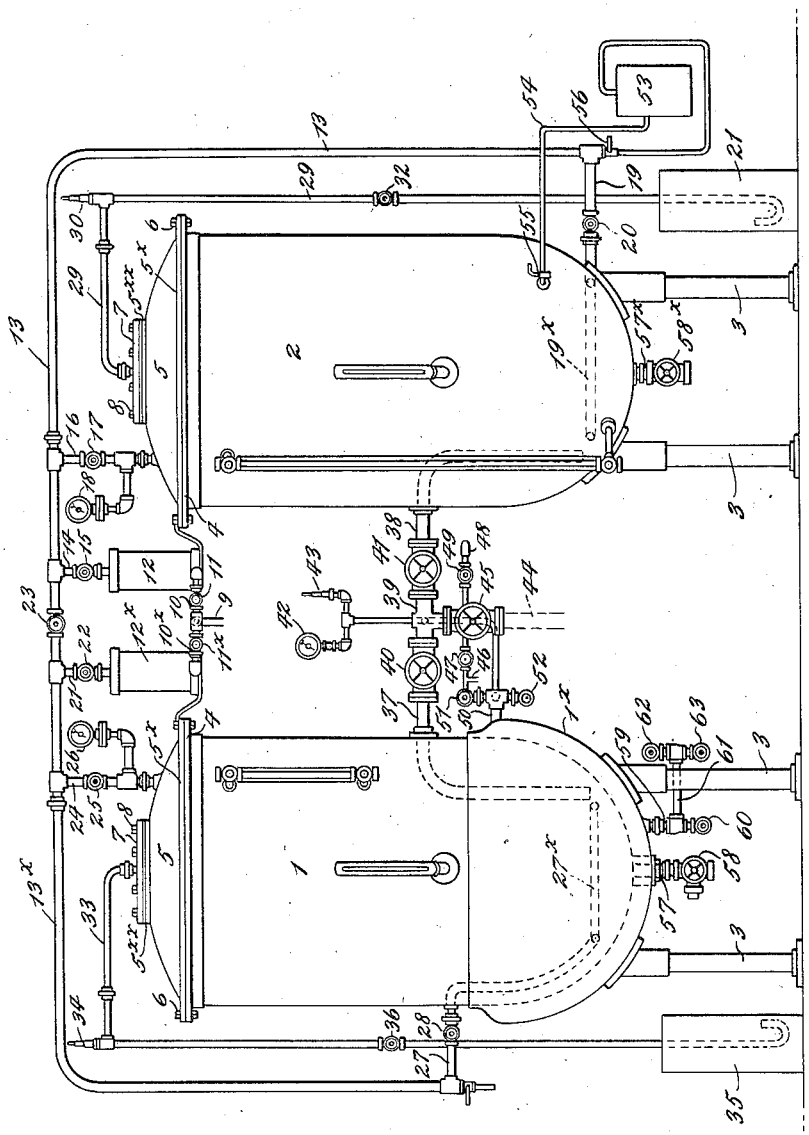

PURE YEAST CULTURE APPARATUS

Robert Schwarz, White Plains, and Albert R. Erda, New York, N. Y., assignors to Schwarz Laboratories, Inc., New York, N. Y., a corporation of New York Application July 16, 1937, Serial No. 153,916

14 Claims. (Cl. 195—141)

This invention relates to improvements in apparatus for continuous large scale production, under sterile conditions, of pure culture yeast intended for use in brewing, distilling, wineries, manufacture of bakers' yeast, and other fermentation industries, and the invention relates particularly to a construction by means of which two primary problems in such apparatus are overcome, these problems relating to the control of sterile air not only for aeration purposes but for mechanical agitation purposes, and to the control of sterilization by live steam of certain interior surfaces.

In overcoming both problems an apparatus has been provided which when once charged with a pure culture enables the production of a constant supply of yeast of unvarying character.

A pure yeast culture apparatus in general consists of a plurality of air and pressure-tight chambers, the chambers containing air and vent lines, wort and yeast transfer lines, steam and water lines, level gauges, and safety and other valves and cocks. A yeast culture, which has been selected by the method of single cell isolation and propagated in the laboratory under sterile conditions in Pasteur flasks and Carlsberg vessels, is introduced into the apparatus and propagated further under sterile conditions until a sufficient quantity of pure culture yeast is obtained to pitch a considerable amount of wort.

In past apparatus of such character, sterilization of the interior surfaces has been difficult due to the character and multiplicity of such things as transfer lines from the sterilizer to the propagator and from the propagator to the point of discharge therefrom and also due to the difficulty of adequately sterilizing the transfer lines independently of the sterilizer and propagator cylinders, and the use of mechanical agitating means in the propagator which increase sterilization difficulties. There have also been difficulties in the injection of seed yeast into the propagator when the sterile wort was kept in the propagator under pressure of sterile air and the seed yeast had to be injected from a container into the propagator by gravity. Also, where steam jackets were employed for the wort sterilizers, in earlier apparatus the transfer line between the sterilizer and propagator entered the sterilizer through the steam jacket which introduced mechanical difficulties of construction and operation.

By means of the present invention these difficulties have been removed by our improvements, a further and important improvement being the provision of means that all air entering the wort sterilizer and propagator is rendered sterile without the necessity of shutting down the apparatus when an element of the air filtering means requires replacement.

The invention will be described with reference to the accompanying drawing. In the drawing, the figure is a diagrammatic view in elevation of an embodiment of the invention, certain parts being shown in dotted lines.

Referring to the drawing, the embodiment therein shown comprises a wort sterilizer 1 and a propagator 2. A plurality of propagators may be employed if desired, the number depending upon the different types of yeast to be propagated. The net working capacity of each chamber may vary according to plant requirements, as, for example, from 50 to 150 gallons or more. The sterilizer and propagator may be each supported upon legs 3 and the sterilizer is, as shown in the drawing, provided with an outwardly projected steam jacket $1x$. At its top the sterilizer and also the propagator is formed with a heavy laterally extending flange 4 having the diameter of a corresponding flange $5x$ carried by a cover 5, and these flanges may be connected by strong bronze bolts such as indicated at 6, a packing ring being interposed.

Each cover is formed with a ring flange $5xx$ to receive a hand hole cover 7, a packing ring being interposed and the cover bolted down tightly by means of bolts such as indicated at 8. This provision facilitates easy cleaning and inspection of the apparatus without the necessity of removing the large covers.

The sterile air control

The air supply enters the apparatus through a pipe 9 entering two branch pipes 10, $10x$, each of which may be shut off from pipe 9 by a valve, the two valves being indicated at 11, $11x$.

Branch pipe 10 leads to the base of filtering cylinder 12 and branch pipe $10x$ leads to the base of filtering cylinder $12x$. Thus in general a separate cylinder packed tightly with sterile cotton is used for each of the sterilizing and propagating chambers.

In the usual pure yeast culture apparatus, if a filtering cylinder should get out of order, the whole operation must stop. In the present apparatus, one of the filters can be removed for resterilization at any time. The chambers may receive sterile air either simultaneously through both filters, or each separately through a different filter, or both through one filter.

Filter 12 at the top thereof, is connected to sterile air-line 13 through a pipe 14 controlled by valve 15. Air-line 13 communicates with a branch air-line 16 leading to the interior of the propagator 2 and controlled by a valve 17. Applied to air-line 16 is a counter pressure gauge 18. Airline 13 is formed with a vertical extension at the side of the propagator 2 and enters the propagator through a branch pipe 19 controlled by valve 20.

Filter 12x at the top thereof is connected to sterile airline 13x through a pipe 21 controlled by a valve 22, and the valve 23 is adapted to shut off communication between airlines 13 and 13x, or to open up such communication.

Airline 13x communicates with a branch airline 24 entering the sterilizer 1 at the top thereof, and controlled by valve 25 to which is applied a counter pressure gauge 26. Airline 13x also communicates with the sterilizer toward the lower end thereof, by means of a branch pipe 27 controlled by valve 28.

Leading from the hand hole cover 7 of the propagator 2, is an air and gas vent pipe 29 having a pressure operated safety valve 30, and thence leading downwardly to a water seal 31. Above the water seal, pipe 29 is controlled by a valve 32.

Leading to the interior of the sterilizer 1 through hand hole cover 7 is an air and gas vent pipe 33 provided with a pressure safety valve 34 and thence leading downwardly to a water seal 35, a valve 36 controlling pipe 33 above the water seal.

It will be noted that a branch pipe 19 carrying sterile air into the propagator is formed, within the propagator, as an air injection body which may be ring-shaped in practice and provided with perforations or nozzles directed toward the base of the propagator, the element being indicated at 19x.

It will also be noted that branch pipe 27 leading air into the sterilizer is formed with a continuation in the sterilizer extended downwardly and thence horizontally, which horizontal extension may be ring-shaped and provided with perforations or nozzles directed toward the base of the propagator, the member being indicated at 27x. In other words, aeration member 27x enters the sterilizer above the stem jacket 1x and then extends downwardly toward the base of the sterilizer, and then extends horizontally.

*Transfer of wort and yeast*

At a point above outer jacket 1x the wall of sterilizer 1 is apertured to receive a pipe 37 which, within the sterilizer, extends downwardly, its lower end however being placed above the base of the sterilizer. Also passing through the wall of the propagator at a point in line with pipe 37 is a pipe 38 which extends downwardly within the propagator, its lower end being above the base of the propagator.

Pipes 37 and 38 are connected by a T-shaped connecting member 39 having four outlets and between the connector and the sterilizer is valve 40. A similar valve 41 is placed between the connector and pipe 37. The T-shaped connector has applied thereto a pressure indicator 42 and a pressure safety valve 43, these being disposed at the top of the connector. At the base of the connector for indicating and controlling jacket pressure conditions is a discharge pipe 44 controlled by a valve 45. At one side of the connector is a steam inlet pipe 46 controlled by a valve 47, and at the opposite side of the connector it communicates with a wash water pipe 48 controlled by a valve 49.

The steam pipe 46, in addition to its communication with the T-connector, leads to an inlet member 50 for the steam jacket 1x, a valve 51 being adapted to open and close steam connection with the steam jacket. Inlet member 50 also is provided with a valve 52 for controlling cooling water outflow from the jacket.

At 53, we have shown a container for seed yeast connected with a discharge pipe 54 connected with a culture injection valve 55 of the propagator.

Sterile airline 13 is formed with a short extension adapted for connection with the seed yeast container 53, said extension being controlled by valve 56, so that when valves 55 and 56 are open, seed yeast may be injected into the propagator under the pressure of sterile air.

The bottoms of the sterilizer and propagator chambers are hemispherical to permit complete drainage and provided with discharge outlets at 57 and 57x controlled by valves 58, 58x, respectively.

The sterilizer steam jacket is provided with a drain at 59 controlled by a valve 60, the drain having a branch connection 61 leading to a cooling water inlet controlled by valve 62, and a steam return outlet controlled by valve 63.

In the operation of the apparatus, it may be first steam sterilized as a whole. Steam may be injected into the transfer line via pipe 46, with valve 51 closed and valves 47, 49 and 41 open. The live steam will effectively sterilize the transfer line between the sterilizer and propagator, and the entire interior surfaces of the two latter elements. In this sterilizing action the airline valves such as 17 and 25 and the vent valves 28 and 32 will be closed. Water may be introduced into the apparatus through valve control pipe 48 or wherever more convenient and brought to boiling by direct steam entering at 46 through the rear of the connector T into the chambers, and also by jacket heating. The liberated steam and hot water may be used to rinse, drain and sterilize the lines and valves where accessible. The hot water may be drained off at 57 through opening the valves 58, 58x. Steaming should follow the rinsing and draining operation. By opening and closing the airline and vent valves, the steam will be permitted to blow through the airlines and their valves and connections. During such sterilization, the cotton filters will be removed.

To prevent formation of a vacuum after steaming, positive pressure should be maintained by the admission of sterile air through the filters or one of them, otherwise the vacuum, formed by condensation of the steam, will result in drawing non-sterile air into the apparatus.

During the cooling of the propagator, and while it is under pressure of sterile air, hot wort is introduced into the sterilizer at 57, gradually replacing the mixture of air and steam which escapes through the water seal 35, valve 36 being open and all other valves being closed. Thus the pipe 57 is used both for the introduction of the hot wort into the sterilizer and for draining the sterilizer. By jacket heating the wort is boiled and the steam from the boiling wort will escape through vent pipe 33, valve 36 being open and all other valves being closed.

When sterilization is about completed, a strong current of sterile air is introduced into the sterilizer through the opening of valve 25 which, mixed with steam, escapes through the vent pipe 33. With valve 25 closed, the wort may frequently be aerated by forcing sterile air through the air injector at the base of branch pipe 27.

At the same time, cooling may be effected by introducing brine or other cooling medium into the jacket 1x through pipe 59 and branch pipe 61 controlled by valve 62, after which the sterilizer may be allowed to rest to settle out and deposit in its base the precipitated protein and hop resins, i. e., "sludge".

Upon opening valves 40 and 41 and injecting sterile air under pressure into the sterilizer, the wort, free from sludge, may be passed through pipe 37, the T-connection 39 and pipe 38 into the propagator. The laboratory culture from a Carlsberg vessel or shipping container, indicated at 53 is placed into the propagator under the pressure of sterile air by opening valves 55 and 56 and the mixture within the propagator is well aerated by admitting air through perforated pipe 19x in the manner described, and fermentation ensues.

While fermentation is proceeding in the propagator, valve 41 being closed, together with such valves as 25 and 28, the sterilizer 1 may be drained and washed out, the transfer line may be drained and washed out and then the transfer line, the sterilizer, and all immediate connecting members may be steam sterilized, whereupon fresh wort may be introduced into the sterilizer and sterilized.

When fermentation in the propagator is completed, the yeast, either accompanied by the beer or separately, will be transferred for utilization under the pressure of sterile air, valves 41 and 45 being open and valve 40 being closed. The cool sterile wort in the sterilizer 1 may then be transferred to the propagator. Owing to the arrangement of the transfer line, sufficient yeast is retained in the propagator to start the said charge of sterile wort. The cycle is then repeated and consequently, forms a continuous operation. The transfer line is washed out and steam sterilized before and after each transfer operation.

Should air filter 12 become inoperative or fail to function, valves 15 and 11 may be closed and the air entering both the sterilizer and propagator may be passed through air filter 12x and then through airlines 13, 13x, to the respective members, permitting air filter 12 to be recharged with sterile cotton and resterilized. Likewise, should filter 12x become inoperative or fail to function, valves 22 and 11x may be closed, the air entering the sterilizer and propagator being purified by filter 12.

The provision of a common transfer from the sterilizer to the propagator and from the propagator to the exterior, enables sterilization of the transfer and discharge line whilst the propagator or the sterilizer, or both, are in action, and there are fewer parts which must be sterilized.

By carrying the sterilizer transfer pipe through the wall of the sterilizer and thence downwardly alongside the steam jacket area and ending it at a point above the base of the sterilizer, the use of the sterile air under pressure will effectively transfer the wort without transfer of the sludge to the propagator. Mechanical stirrers are dispensed with, the pressure of the sterile air being employed to mechanically agitate the yeast. From 2 to 30 pounds gauge pressure may be employed and the jets of the aeration pipe 19 being directed downwardly, will exert a raising action upon the sediment of yeast at the base of the propagator simultaneously with the inward flow of the sterilized wort so as to effectively mix the two bodies. In other words, the heavy sediment of yeast will be mechanically moved out of the way of the incoming sterile and cooled wort, and the incoming air will thoroughly mix the materials.

Having described our invention, what we claim and desire to secure by Letters Patent, is as follows:—

1. An apparatus for continuous production, under sterile conditions, of pure culture yeast, comprising a wort sterilizer and a propagator, means for injecting air under pressure into the sterilizer and propagator, venting means for the sterilizer and propagator, means for heating and cooling the sterilizer, and a common transfer means from the sterilizer to the propagator and from the propagator to the exterior, said means comprising a conduit leading through the wall of the sterilizer and then downwardly to a point above the base thereof, a conduit leading through the wall of the propagator and then extending downwardly to a point above the base thereof, a connector for said conduits having a discharge end and a valve for controlling the same, and a plurality of valves, one for controlling the conduit leading to the sterilizer, and one for controlling the conduit leading to the propagator.

2. An apparatus for continuous production, under sterile conditions, of pure culture yeast, comprising a wort sterilizer and a yeast propagator, means for injecting air under pressure into the sterilizer and propagator, venting means for the sterilizer and propagator, means for heating and cooling the sterilizer and common transfer means from the sterilizer to the propagator and from the propagator to the exterior, said means comprising a conduit leading through the wall of the sterilizer, a conduit leading through the wall of the propagator, a connector for said conduits having a discharge end and a valve for controlling the same, and a plurality of valves, one for controlling the conduit leading to the sterilizer, and one for controlling the conduit leading to the propagator.

3. An apparatus for continuous production, under sterile conditions, of pure culture yeast, comprising a wort sterilizer, and a propagator, venting means for the sterilizer and propagator, means for heating and cooling the sterilizer, and a common transfer means from the sterilizer to the propagator, and from the propagator to the exterior, said means comprising a conduit leading through the wall of the sterilizer and then downwardly to a point above the base thereof, a conduit leading through the wall of the propagator and then extending downwardly to a point above the base thereof, and a connector for said conduits having a valve controlled opening, means for injecting air under pressure into the sterilizer and propagator, comprising an airline leading to the sterilizer and propagator, two air filters common to said airline, and controlling means for said air filters and airlines adapted to effect the passage of sterile air to the sterilizer or propagator through both filters simultaneously, to the sterilizer through one filter, and to the propagator through another filter, or to both the sterilizer and propagator through one filter.

4. An apparatus for continuous production under sterile conditions, of pure culture yeast, comprising a wort sterilizer, a propagator, venting means for the sterilizer and propagator, means for heating and cooling the sterilizer, transfer means from the sterilizer to the propagator and from the propagator to the exterior, means for injecting air under pressure into the sterilizer and propagator, comprising an airline leading to the sterilizer and propagator, two air filters common to said air line, and controlling means for said air filters and airlines adapted to effect the passage of sterile air to the sterilizer or propagator through both filters simultaneously, to the sterilizer through one filter, and to the propagator through another filter, or to both the sterilizer and propagator through one filter.

5. An apparatus for continuous production, under sterile conditions, of pure culture yeast, comprising a wort sterilizer, and a propagator, venting means for the sterilizer and propagator, means for heating and cooling the sterilizer, and a common transfer means from the sterilizer to the propagator, and from the propagator to the exterior, said means comprising a conduit leading through the wall of the sterilizer and then downwardly to a point above the base thereof, a conduit leading through the wall of the propagator and then extending downwardly above its base, a connector for said conduits, said means being adapted to maintain a sediment of yeast in the base of the propagator, and means for agitating said sediment during and after the admission of sterile and cooled wort into the propagator from the sterilizer, said means comprising an air line, filtering means intermediate the air line and a source of air under pressure, an air injection conduit leading through the wall of the propagator and having an extension disposed adjacent the yeast sediment portion of the propagator, said extension having air ducts directed toward the base wall of the propagator, and valve control means for said extension.

6. An apparatus for continuous production, under sterile conditions, of pure culture yeast, comprising a wort sterilizer, a propagator, venting means for the sterilizer and propagator, means for heating and cooling the sterilizer, transfer means from the sterilizer to the propagator and from the propagator to the exterior, and means for agitating a sediment of yeast present on the bottom of the propagator, during and after the admission of sterile and cooled wort into the propagator from the sterilizer, said means comprising an airline, filtering means intermediate the airline and a source of air under pressure, an air injection conduit leading through the wall of the propagator and having an extension disposed adjacent the yeast sediment in the propagator, said extension having air ducts directed toward the base wall of the propagator, and valve control means for said extension.

7. In apparatus of the character set forth, in combination with a wort sterilizer, a yeast propagator, means for injecting air under pressure into the sterilizer and propagator, venting means for the sterilizer and propagator, transfer means from the sterilizer to the propagator and from the propagator to the exterior, said means being adapted to maintain the precipitated and settled out sludge after sterilization of wort within the sterilizer at the base thereof and maintain a dominant sediment of yeast within the propagator at the base thereof, means for draining away said sludge and said sediment of yeast pool, steam sterilizing means for the propagator and sterilizer, and means for injecting seed yeast into the propagator under sterile air pressure, comprising a valve controlled inlet for the propagator and adapted for air-tight connection with a seed yeast container, and a valve controlled connection with said air injection means adapted for air-tight connection with the said seed yeast container.

8. An apparatus of the character set forth, consisting of a wort sterilizer and a yeast propagator, means for injecting air under pressure into the sterilizer and propagator, venting means for the sterilizer and propagator, transfer means from the sterilizer to the propagator, and from the propagator to the exterior, steam sterilizing means for the propagator and sterilizer and means for injecting seed yeast into the propagator under sterile air pressure, comprising a valve controlled inlet for the propagator and adapted for air-tight connection with a seed yeast container, and a valve controlled connection with said air injection means adapted for air-tight connection with said seed yeast container.

9. An apparatus of the character set forth, in combination with a wort sterilizer, a yeast propagator, means for injecting air under pressure into the sterilizer and propagator, venting means for the sterilizer and propagator, steam sterilizing means for the propagator and sterilizer, transfer means from the sterilizer to the propagator and from the propagator to the exterior, said means being adapted to maintain the precipitated and settled out sludge after sterilization of wort within the sterilizer at the base thereof and to maintain a dominant sediment of yeast within the propagator at the base thereof, and means for draining away said sludge and said dominant sediment of yeast, said means comprising at the base of the cylinder hemispherical bottoms provided with drains.

10. An apparatus for continuous production, under sterile conditions, of pure culture yeast, comprising a wort sterilizer, provided at its lower portion with a steam jacket and valve controlled steam inlet therefor, and a propagator, venting means for the sterilizer and propagator, means for heating the sterilizer, and a common transfer means from the sterilizer to the propagator and from the propagator to the exterior, said means comprising a conduit leading through the wall of the sterilizer above the steam jacket and then downwardly to a point above the base of the sterilizer, a conduit leading through the wall of the propagator substantially in line with said sterilizer conduit, and then extending downwardly to a point above the base of the propagator, a connector for said conduits having a discharge end and a valve for controlling the same, a plurality of valves, one for controlling the conduit leading to the sterilizer, and one for controlling the conduit leading to the propagator, means for injecting air under pressure into the sterilizer and propagator, means for sterile aeration of wort consisting of an air inlet conduit entering the sterilizer above the steam jacket and then extending downwardly and having above the base a horizontal continuation perforated for jets of air.

11. An apparatus for continuous production under sterile conditions, of pure culture yeast, comprising a wort sterilizer, provided at its lower portion with a steam jacket and valve controlled steam inlet therefor, and a propagator, venting means for the sterilizer and propagator, means for heating the sterilizer, transfer means from the sterilizer to the propagator and from the propagator to the exterior, means for injecting air under pressure into the sterilizer and propagator, and means for sterile aeration of wort consisting of an air inlet conduit entering the sterilizer above the steam jacket and then extending downwardly and having above the base a horizontal continuation perforated for jets of air.

12. An apparatus for continuous production, under sterile conditions, of pure culture yeast, comprising a wort sterilizer, and a propagator, means for injecting air under pressure into the sterilizer and propagator, venting means for the sterilizer and propagator, means for heating the sterilizer, and a common transfer means from the sterilizer to the propagator and from the propagator to the exterior, said means comprising a conduit leading through the wall of the sterilizer and then downwardly to a point above the base thereof, a conduit leading through the wall of the propagator and then extending downwardly to a point above the base thereof, a connector for said conduits having a discharge end and a valve for controlling the same, a wash water inlet for said connector, a steam inlet for said connector, and a plurality of valves, one for controlling the conduit leading to the sterilizer and one for controlling the conduit leading to the propagator.

13. An apparatus for continuous production, under sterile conditions, of pure culture yeast, comprising a wort sterilizer, a yeast propagator, means for injecting air under pressure into the sterilizer and propagator, venting means for the sterilizer and propagator, means for heating the sterilizer, and a common transfer means from the sterilizer to the propagator and from the propagator to the exterior, said means comprising a conduit leading through the wall of the sterilizer, a conduit leading through the wall of the propagator, a connector for said conduits having a discharge end and a valve for controlling the same, a wash water inlet for said connector, a steam inlet for said connector, and a plurality of valves, one for controlling the conduit leading to the sterilizer and one for controlling the conduit leading to the propagator.

14. An apparatus for continuous large production, under sterile conditions, of pure culture yeast intended for use in brewing, distilling, wineries, manufacture of bakers' yeast, and other fermentation industries, consisting of a wort sterilizer-cylinder, and a propagator-cylinder, each cylinder having on its top center a large cover provided with a hand hole cover, vent lines passing through said hand hole covers, hemispherical bottoms for the cylinders provided with drains, air coils extending above said bottoms for aeration of wort and beer and air agitation of yeast in the propagator-cylinder, a steam jacket on the sterilizer-cylinder for heat-sterilizing and cooling the wort, air and vent lines leading to and from the cylinders, steam and water lines leading to the cylinders, and dual filters for sterilization of air entering the system adapted for either simultaneous or alternate action, a valve-controlled transfer line adapted for transferring the wort from the sterilizer into the propagator and also, for discharging the beer and yeast from the propagator into plant operation, the transfer line being connected to an outlet conduit in the sterilizer-cylinder adapted to prevent transferring sludge from the sterilizer into the propagator, the transfer line also being connected to an outlet conduit in the propagator-cylinder adapted to operate without disturbance of the residual sediment of yeast culture in the propagator to start the next fermentation, the transfer line having water and steam connections for cleaning and sterilizing the same before and after each operation.

ROBERT SCHWARZ.
ALBERT R. ERDA.